United States Patent
Harned

[15] 3,677,476
[45] July 18, 1972

[54] METHOD OF FINE-GRINDING

[72] Inventor: William L. Harned, Kingsport, Tenn.

[73] Assignee: Eastman Kodak Company, Rochester, N.Y.

[22] Filed: July 1, 1970

[21] Appl. No.: 51,478

[52] U.S. Cl.................................241/21, 241/30, 241/46.02, 241/172
[51] Int. Cl.............................................B02c 17/00
[58] Field of Search........................241/5, 15, 16, 21, 22, 27, 241/30, 20, 172, 46.02, 46.17, 171

[56] References Cited

UNITED STATES PATENTS

| | | | |
|---|---|---|---|
| 3,185,398 | 5/1965 | Hughes | 241/20 |
| 3,448,931 | 6/1969 | Myatt | 241/30 X |
| 3,226,044 | 12/1965 | Matsubayashi | 241/172 |
| 3,350,280 | 10/1967 | West | 241/172 X |
| 3,332,628 | 7/1967 | Wadham | 241/172 X |

*Primary Examiner*—Donald G. Kelly
*Attorney*—Cecil D. Quillen, Jr. and John F. Stevens

[57] ABSTRACT

A method of grinding particulate matter comprising passing a fluid mixture comprising particulate matter and grinding bodies of a size between about 60 and about 200 mesh in a fluid vehicle through an impeller rotating at a speed to impart kinetic energy to said fluid mixture sufficient to achieve grinding. Preferably, particulate matter is ground to a size from about 0.5 to about 1.5 microns by circulating a fluid mixture comprising particulate matter to be ground and annealed glass grinding bodies of a size between about 60 and about 200 mesh in a fluid vehicle through an impeller of a centrifugal pump, the impeller rotating at a peripheral speed of at least 3,000 ft/min.

4 Claims, 2 Drawing Figures

Patented July 18, 1972

3,677,476

WILLIAM L. HARNED
INVENTOR

BY

ATTORNEYS

METHOD OF FINE-GRINDING

This invention relates to a new and improved process of dispersing particulate mater in a liquid media and/or reducing the particle size of particulate mater and apparatus suitable therefor.

Conventional methods of grinding and dispersing particulate matter in liquid vehicles have employed the kinetic energy of grinding bodies to reduce the particle or agglomerate size to the desired dimensions through the use of such equipment as ball and pellet mills, sand grinders and the like. For the most part, these methods require an excessive period of grinding to make a single batch of such products as paint, ink or other solid particle-liquid dispersions. In addition, the use of a large-diameter, abrasive grinding media can often cause increased wear of equipment with concomitant maintenance problems and reduced efficiency.

Accordingly, one aspect of the present invention is to provide a method of grinding and dispersing particulate matter in a liquid media which uses extremely small diameter grinding bodies tending to cause little wear on the grinding apparatus. Another aspect of the present invention is to provide a method of grinding particulate matter to extremely fine dimensions in less time than is possible employing prior art methods. Still another aspect of the present invention is to provide a grinding method employing simple, standard equipment to produce ground particles of extremely fine dimensions.

It has now been discovered that a new process resulting in greatly improved production rates of dispersions containing extremely small particles approaching less than 1 micron in size can be carried out by circulating a fluid mixture comprising the particulate matter to be ground and sufficient amounts of grinding bodies of a size between about 60 and about 200 mesh in a fluid vehicle through an impeller rotating at a peripheral speed sufficient to impart to the fluid mixture kinetic energy sufficient to produce grinding. Preferably, the process of the invention is carried out by employing beads having a size of from about 60 to about 200 mesh as the grinding bodies in the fluid mixture, which is circulated through an impeller of a centrifugal pump having a peripheral speed of at least 3,000 feet per minute.

By employing the process of the present invention, grinding rates are greatly improved thereby producing particles having finer size in the same period of time than possible through the use of prior art methods. Alternatively, the process of the present invention can be used to achieve a given particle size reduction in less time than possible through the use of prior arts methods. These greatly improved grinding rates may be achieved without resort to complex equipment requiring frequent maintenance; instead, simple and standard apparatus may be employed. The method of the present invention is useful to produce dispersions of almost any fine solids in liquids, including dyes, particulate matter and the like.

The impellers used to carry out the present invention are available as standard equipment and are well known in the art. Essentially, the structure of the impellers useful in the present invention is characterized by a number of vanes which may be curved or straight, radially disposed about a rotatable shaft and enclosed within a casing. Impellers may have their axis of rotation either horizontal or vertical. Typically, the energy to drive the impeller is provided by a motor which turns the shaft. In operation, the blades of the impeller in revolving produce a partial vacuum at the entrance or eye of the impeller. This causes material to flow into the impeller and forces the material outward along the impeller blades at an increasing velocity. The velocity head it has acquired when it leaves the blade tips is changed to pressure head as the liquid passes into the chamber and out of the discharge. In carrying out the process of the present invention, an impeller peripheral speed of at least 3,000 ft/min. is required to impart sufficient kinetic energy to the fluid containing the particulate matter and the grinding bodies to achieve the high grinding rates necessary for the process of the present invention.

While the impellers useful in the present invention are, in a preferred embodiment thereof, part of a standard centrifugal pump, it is to be understood that impellers driven by other means may also be used so long as the impeller achieves the critical peripheral speed necessary to achieve grinding according to the process of the present invention.

Grinding bodies useful in the process of the present invention are those having a size of from about 60 to about 200 mesh, and of suitable hardness to produce grinding. While annealed glass beads are to be preferred due to their resistance to breaking, surface smoothness toward the pump impeller and their lack of abrasiveness, such materials as metals, ceramic or sand of the mesh sizes cited above may also be used.

The fluid vehicles in which the particulate matter to be ground and the grinding bodies are dispersed include water and common organic liquids. So long as the fluid used does not adversely affect the chemical or physical characteristics of the particulate matter, the choice of fluids is optional though water is ordinarily preferred.

In order to more clearly describe the present invention, reference is made to the accompanying drawings which illustrate one embodiment of an apparatus suitable for carrying out the invention.

Figure 1:
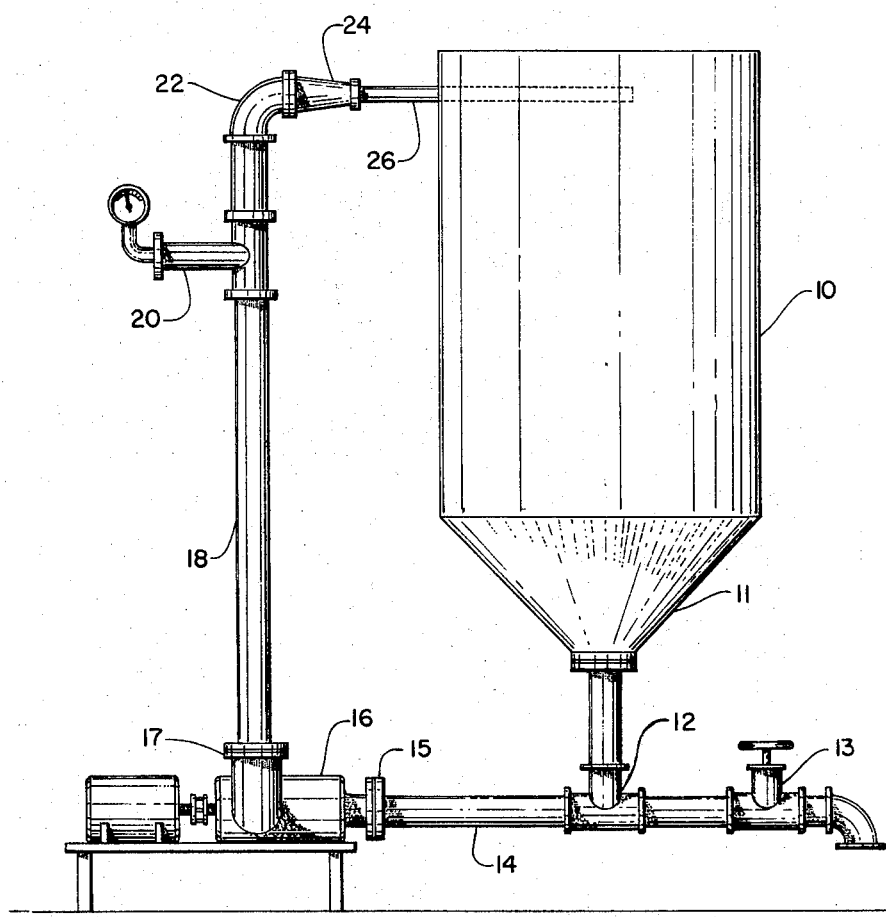
FIG. 1 is a front view of the grinding unit in full assembly.

Referring to FIG. 1, the apparatus comprises a vertical cone-bottomed tank 10 connected through a flange member 11 to a tee 12. The discharge from the grinding unit through tee 12 is controlled by a valve 13. A horizontal portion 14 serves as a pump inlet line and is connected through flange member 15 to a centrifugal pump 16. A pump outlet line 18 is connected to pump 16 through flange member 17. A pressure gauge 20 is located along pump outlet line 18 to measure the pressure in the line. The pump outlet line 18 is connected to a tangential tank return line 26 through an elbow 22 and bell reducer 24.

It should be understood that the drawings illustrate a simple example of the many embodiments useful in the broad aspects of this invention and, therefore, illustrate only the basic elements involved. For instance, a cooling jacket may be installed along line 18 to maintain the temperature of the particulate matter dispersion at a desirable level.

Figure 2:
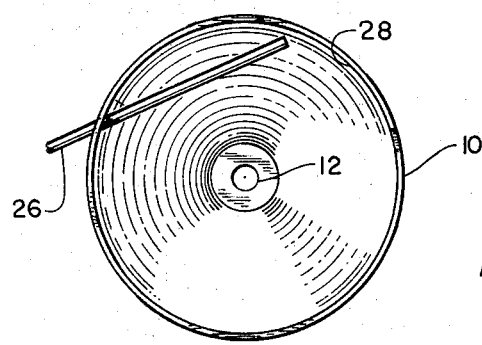
FIG. 2 is a top elevation of the tank and discharge line of the dispersing unit.

With further reference to FIG. 1, a preferred practice of the present invention is carried out as follows: Particulate matter such as, for example, dye particles and aqueous vehicle are premixed into a paste containing from about 30 to about 60 percent, and preferably from 35 to 45 percent, solids. To this paste may be advantageously added a dispersing agent such as, for example, a lignin sulfonate compound. Annealed glass beads of a size from about 60 to about 200 mesh, preferably from 100 to 200 mesh, are added in ratios of about 0.8 to about 1.2 pounds paste per pound of glass beads. Such a paste-glass bead mixture is charged into tank 10 and moved by gravity through tee 12 into centrifugal pump 16 via pump input line 14. The paste-glass bead mixture passes through the pump impeller where the mixture is subjected to high particle velocities approaching the peripheral velocity of the pump impeller. Having passed through the impeller region of centrifugal pump 16, the pressure of the pump forces the paste-glass bead mixture along pump discharge line 18, through fittings 22 and 24, along tangential return line 26 and into tank 10. By returning the paste-bead mixture to the tank along the inner periphery 28 of the tank as illustrated in FIG. 2, and at an angle perpendicular to the axis of the tank, any undesirable mixing effects which tend to cause an uneven reduction in particle size are minimized, as plug flow conditions are approximated. The paste-bead mixture may be recycled as many times as is necessary to achieve the desired particle size.

In employing the preferred method of the present invention, grinding rates of from about 50 to about 200 pounds paste per hour achieve from about 80 percent to about 98 percent reduction of particle size to less than 1 micron, depending upon the ratio of glass beads to paste, the size of glass beads used and the pump capacity used. These grinding rates are considerably greater than those achieved by the prior art in that a greater amount of paste is ground to extremely fine size in a shorter period of time.

The following examples more fully illustrate the manner in which the present invention is carried out. In the examples, the dyes ground have an initial size of over 10 microns and are listed by their color index generic name.

EXAMPLES 1-9

A centrifugal pump and pipeline arrangement substantially as shown in FIGS. 1 and 2 wherein centrifugal pump 16 is a 50 gallon/min. capacity stainless steel centrifugal pump having an 8 inch impeller and a 70 foot pressure head, and wherein tank 10 has approximately a 30 gallon capacity, is charged with various dye mixes, lignin sulfonate dispersing agent and annealed glass beads. The various examples of Table 1 reflect the results achieved when different dye/bead ratios are employed, as well as the effect of varying the bead sizes, and the grinding rates. The apparatus of Run 9 is modified by adding a 40 foot length of 2 inch pipe to the circulating system. This is done to illustrate that the grinding action of the process occurs within the pump and not, to any appreciable extent, within the pipeline.

The above-tabulated data indicates that the grinding efficiency is increased by increasing the glass bead to dye ration and/or decreasing the size of the grinding beads used. Comparison of examples in Table I and Table II indicate that increasing the pump capacity increases the grinding rate substantially, while producing much finer particles in a given period of time. Examples 8 and 16, in which a 40 foot section is added to the circulating line, show that all or nearly all of the grinding takes place in the pump and not in the external lines or tank when compared with Examples 7 and 15 with equal feed ratios.

The invention has been described in detail with particular reference to preferred embodiments thereof, but it will be understood that variations and modifications can be effected within the spirit and scope of the invention.

I claim:

1. A method of grinding particulate matter which comprises the steps of
   a. charging a container with a fluid mixture comprising particulate matter and grinding bodies of a size between about 60 and about 200 mesh in a fluid vehicle,
   b. withdrawing the fluid mixture from the container by means of a centrifugal pump having an impeller rotating at a peripheral speed of at least 3,000 ft./min. whereby said fluid mixture enters said pump at the eye of the impeller, and is forced outwardly along blades of said impeller at an increasing velocity, and

TABLE I

| Example | Dye | Wet mix, pounds | Glass beads | | Pump pressure, p.s.i.g. | Solids, percent | 100% dye cake, pounds | Grinding rate, lbs./hr. | | Particle size | |
| | | | Pounds | (Mesh) size | | | | Wet mix | 100% cake | Hrs. | Percent less than 1µ |
|---|---|---|---|---|---|---|---|---|---|---|---|
| 1 | Dispersed Blue 61 | 150 | 100 | 100 | 22 | 36 | 14.2 | 37.5 | 3.55 | 4 | 80.6 |
| 2 | do | 150 | 100 | 100 | 32 | 32 | | 37.5 | | 4 | 84.2 |
| 3 | do | 300 | 200 | 100 | 21 | 32 | 39.5 | 20 | 2.63 | 15 | 80.0 |
| 4 | do | 200 | 200 | 100 | 21 | 27 | 25.6 | 25 | 3.2 | 8 | 82.2 |
| 5 | do | 200 | 200 | 200 | 28 | 34 | 28.0 | 25 | 3.5 | 8 | 89.0 |
| 6 | do | 100 | 100 | 100 | 32 | 32 | 14.7 | 12.5 | 1.83 | 8 | 86.5 |
| 7 | do | 100 | 100 | 100 | 30 | 36 | 16.7 | 12.5 | 2.11 | 8 | 85.4 |
| 8 ᵃ | do | 100 | 100 | 100 | 30 | 34 | 14.6 | 12.5 | 1.82 | 8 | 83.6 |
| 9 | do | 100 | 100 | 100 | 25 | 33 | 15.2 | 12.5 | 1.90 | 8 | 83.2 |

ᵃ With batch circulating through a 40-foot section of 2-inch pipe.

EXAMPLES 10-19

The method of Examples 1-9 is followed, except that a centrifugal pump having a 9½ inch impeller, and an 80 gallon/min. capacity is used in place of the pump of Examples 1-9. Example 16 is modified by addition of 40 feet of 2 inch pipe to the circulating line to determine if grinding takes place in the line as well as the impeller.

c. discharging said fluid mixture from said pump.

2. The method according to claim 1 wherein said grinding bodies are made of annealed glass.

3. The method of claim 2 wherein said annealed glass grinding bodies are of a size between about 100 and about 200 mesh.

4. The method of claim 1 wherein said particulate matter produced is of a particle size of from about 0.5 to about 1.5 microns.

* * * * *

TABLE II

| Example | Dye | Wet mix, pounds | Glass beads | | Pump pressure, p.s.i.g. | Solids, percent | 100% dye cake, pounds | Grinding rate, lbs./hr. | | Hrs. | Percent less than 1µ |
| | | | Pounds | (Mesh) Size | | | | Wet mix | 100% cake | | |
|---|---|---|---|---|---|---|---|---|---|---|---|
| 10 | Dispersed Blue 64 | 200 | 200 | 100 | 42 | 37 | 27.0 | 25 | 3.37 | 8 | 95.5 |
| 11 | do | 200 | 200 | 100 | 43 | 36 | 31.6 | 100 | 15.8 | 2 | 96.1 |
| 12 | do | 200 | 200 | 100 | 42 | 44 | 29.3 | 100 | 14.65 | 2 | 97.5 |
| 13 | do | 300 | 300 | 100 | 42 | 35 | 46.6 | 150 | 23.3 | 2 | 95.8 |
| 14 | Dispersed Red 88 | 105 | 100 | 60 | 23 | 23 | 14.5 | 52.5 | 7.25 | 2 | 98.0 |
| 15 | Dispersed Violet 42 | 200 | 200 | 100 | 27 | 21 | 20.2 | 50 | 5.04 | 8 | 98.8 |
| 16 ᵃ | do | 200 | 200 | 100 | 27 | 19 | 19.5 | 50 | 4.88 | 4 | 94.2 |
| 17 | Dispersed Blue 62 | 180 | 150 | 100 | 30 | 26 | 21.2 | 22.5 | 3.02 | 8 | 86.2 |
| 18 | do | 160 | 160 | 100 | 48 | 31 | 18.2 | 40 | 1.55 | 4 | 99.0 |
| 19 | do | 300 | 300 | 100 | 43 | 26 | 28.3 | 37.5 | 3.53 | 8 | 98.8 |

ᵃ With batch circulated through a 40-foot section of 2-inch pipe.